(12) United States Patent
Honda et al.

(10) Patent No.: US 9,407,649 B2
(45) Date of Patent: Aug. 2, 2016

(54) LOG ANALYSIS DEVICE AND METHOD

(71) Applicant: FUJITSU LIMITED, Kawasaki-shi, Kanagawa (JP)

(72) Inventors: Satomi Honda, Yokohama (JP); Yuki Fujishima, Yokohama (JP); Masahiko Takenaka, Kawasaki (JP); Satoru Torii, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/482,120

(22) Filed: Sep. 10, 2014

(65) Prior Publication Data

US 2015/0106930 A1    Apr. 16, 2015

(30) Foreign Application Priority Data

Oct. 11, 2013    (JP) .................................. 2013-214198

(51) Int. Cl.
*H04L 29/06*    (2006.01)

(52) U.S. Cl.
CPC ........ *H04L 63/1425* (2013.01); *H04L 63/1408* (2013.01); *H04L 63/1433* (2013.01)

(58) Field of Classification Search
CPC . H04L 63/14; H04L 63/1408; H04L 63/1416; H04L 63/1425; H04L 63/1433
See application file for complete search history.

(56) References Cited

U.S. PATENT DOCUMENTS

| 2006/0259968 | A1  | 11/2006 | Nakakoji et al. |
| 2011/0185419 | A1* | 7/2011  | Boteler ............... H04L 63/1425 726/22 |

FOREIGN PATENT DOCUMENTS

| JP | 2005-196675 | 7/2005 |
| JP | 2005-236862 | 9/2005 |
| JP | 2006-319633 | 11/2006 |
| WO | 2013019198 A1 | 2/2013 |

OTHER PUBLICATIONS

EESR—Extended European Search Report of European Patent Application No. 14183903.5 dated Feb. 18, 2015.

* cited by examiner

*Primary Examiner* — Edward Zee
(74) *Attorney, Agent, or Firm* — Fujitsu Patent Center

(57) ABSTRACT

A log analysis device that classifies, based on a log collected from a network device, a plurality of attack target communication devices receiving attacks from an attack source communication device includes a correlation coefficient calculation unit that calculates, based on the log, a correlation coefficient relating to the number of the attacks in a time period during which the attacks were carried out for a combination of the plurality of attack target communication devices, the time period including a detection time at which and the detection period of time during which the network device detected the attack, and an extraction unit that extracts, as a high-correlation communication device group, a combination of the plurality of attack target communication devices, for which the correlation coefficient is equal to or greater than a prescribed threshold and of which the attack source communication device is identical in the time period.

9 Claims, 22 Drawing Sheets

| HACKER | TIME | v1 | v2 | v3 | v4 | v5 | v6 | v7 | v8 | v9 | v10 |
|---|---|---|---|---|---|---|---|---|---|---|---|
| h1 | 11/1 0:01 | | | | | | | | | | |
| h2 | 11/1 4:00 | 12 | 12 | 12 | 12 | 12 | | | | | |
| h2 | 11/1 4:01 | 10 | 9 | 9 | 9 | 9 | | | | | |
| h2 | 11/1 4:02 | 3 | 4 | 4 | 4 | 4 | | | | | |
| h3 | 11/1 4:03 | 0 | 0 | 0 | 0 | 0 | 100 | 0 | 0 | 0 | 0 |
| h4 | 11/1 11:59 | | | | | | | | | | |

COMMUNICATION DEVICE (VICTIM) GROUP HAVING POSSIBILITY OF RECEIVING ATTACK IN FUTURE AS WELL

DATA STRING WITH HIGH CORRELATION

F I G. 6

IDS LOG DB

| HACKER | VICTIM | DETECTION TIME | THE NUMBER OF ATTACKS | PORT |
|---|---|---|---|---|
| 11.22.33.44 | 55.66.77.88 | 2013/4/1 0:00 | 30 | 22 |
| 11.22.33.45 | 55.66.77.88 | 2013/4/2 0:01 | 100 | 3389 |
| : | : | : | : | : |

F I G. 9

ANALYSIS SETTING DB

| ITEM | SETTING VALUE |
|---|---|
| THRESHOLD OF CORRELATION OEFFICIENT | 0.8 |
| INTERVAL OF ANALYSIS | 0.5day |
|  |  |

F I G. 10

COUNTERMEASURE-DESIRED COMMUNICATION
DEVICE IP ADDRESS DB

| IP ADDRESS | PORT | DATE OF ADDITION |
|---|---|---|
| 55.66.77.88 | 22 | 2012/4/1 12:00 |
| 55.66.77.89 | 22 | 2012/4/2 0:00 |
| : | : | : |

F I G. 1 1

| HACKER | ATTACK TARGET COMMUNICATION DEVICE (VICTIM) | DETECTION TIME | THE NUMBER OF ATTACS | PORT |
|---|---|---|---|---|
| 11.22.33.44 | 55.66.77.88 | 2013/4/1 0:00 | 30 | 22 |
| 11.22.33.45 | 55.66.77.88 | 2013/4/2 0:01 | 100 | 3389 |
| .. | .. | .. | .. | .. |

F I G. 12

| PORT = 22 | | ATTACK TARGET COMMUNICATION DEVICE (VICTIM) | | | | | |
|---|---|---|---|---|---|---|---|
| HACKER | TIME | 1.22.33.44 | 2.22.33.44 | 3.22.33.44 | 4.22.33.44 | 5.22.33.44 | |
| 55.66.77.88 | 2013/11/1 0:00 | 30 | 0 | 0 | 0 | 0 | |
| ⋮ | ⋮ | | | | | | |
| 11.22.33.44 | 2013/11/1 4:00 | 12 | 12 | 12 | 12 | 12 | |
| 11.22.33.44 | 2013/11/1 4:01 | 10 | 9 | 9 | 9 | 9 | |
| 11.22.33.44 | 2013/11/1 4:02 | 3 | 4 | 4 | 4 | 4 | |
| 5.5.6.6 | 2013/11/1 4:03 | 0 | 0 | 0 | 0 | 0 | |
| ⋮ | ⋮ | | | | | | |
| 4.3.2.1 | 2013/11/1 11:59 | | | | | | |

F I G. 1 3

| PORT = 22 | | ATTACK TARGET COMMUNICATION DEVICE (VICTIM) | | | | | |
|---|---|---|---|---|---|---|---|
| HACKER | TIME | 11.22.33.44 | 2.22.33.44 | 3.22.33.44 | 4.22.33.44 | 3.22.33.44 | 5.22.33.44 |
| 55.66.77.88 | 2013/11/1 0:00 | 30 | 0 | 0 | 0 | 0 | 0 |
| ... | ... | | | | | | |
| 11.22.33.44 | 2013/11/1 4:00 | 12 | 12 | 12 | 12 | 12 | 12 |
| 11.22.33.44 | 2013/11/1 4:01 | 10 | 9 | 9 | 9 | 9 | 9 |
| 11.22.33.44 | 2013/11/1 4:02 | 3 | 4 | 4 | 4 | 4 | 4 |
| 5.5.6.6 | 2013/11/1 4:03 | 0 | 0 | 0 | 0 | 0 | 0 |
| ... | ... | | | | | | |
| 4.3.2.1 | 2013/11/1 11:59 | | | | | | |

CANDIDATES FOR ATTACK TARGET COMMUNICATION DEVICES (VICTIMS) WITH HIGH CORRELATION

| PORT = 22 | | ATTACK TARGET COMMUNICATION DEVICE (VICTIM) | | | | |
|---|---|---|---|---|---|---|
| HACKER | TIME | 1.22.33.44 | 2.22.33.44 | 3.22.33.44 | 4.22.33.44 | 5.22.33.44 |
| 55.66.77.8 | 2013/11/1 | 30 | 0 | 0 | 0 | 0 |
| ⋮ | ⋮ | | | | | |
| 11.22.33.4 | 2013/11/1 | 12 | 12 | 12 | 0 | 0 |
| 11.22.33.4 | 2013/11/1 | 10 | 9 | 9 | 0 | 0 |
| 11.22.33.4 | 2013/11/1 | 3 | 4 | 4 | 0 | 0 |
| 5.5.6.6 | 2013/11/1 | 0 | 0 | 0 | 100 | 0 |
| ⋮ | ⋮ | | | | | |
| 4.3.2.1 | 2013/11/1 | | | | | |

ATTACK TARGET COMMUNICATION DEVICES (VICTIMS) WITH HIGH CORRELATION

THEY HAVE RECEIVED THE SAME NUMBER OF ATTACKS AT THE SAME TIMES FROM 11.22.33.44

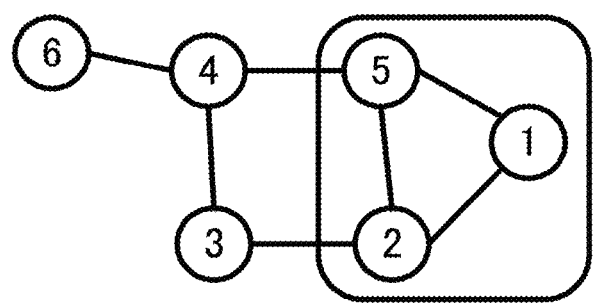
F I G. 16

| | |
|---|---|
| | PAIR OF VICTIMS<br>(VICTIM1, VICTIM2)<br>(VICTIM10, VICTIM13)<br>(VICTIM10, VICTIM14)<br>(VICTIM13, VICTIM14) |

F I G. 1 8 A

| | VERTEXES OF CLIQUE |
|---|---|
| | (VICTIM1, VICTIM2) <br> (VICTIM10, VICTIM13, VICTIM14) |

F I G. 1 8 B

| | |
|---|---|
| | ATTACK TARGET COMMUNICATION DEVICE (VICTIM) GROUP WITH HIGH CORRELATION<br>(VICTIM1, VICTIM2)<br>(VICTIM10, VICTIM13, VICTIM14) |

F I G. 1 8 C

LOG ANALYSIS DEVICE AND METHOD

CROSS-REFERENCE TO RELATED APPLICATION

This application is based upon and claims the benefit of priority of the prior Japanese Patent Application No. 2013-214198, filed on Oct. 11, 2013, the entire contents of which are incorporated herein by reference.

FIELD

The embodiments discussed herein are related to a log analysis device, a log analysis method and a log analysis program.

BACKGROUND

In recent years, cyber attacks in networks have become more active. For example, there is a cyber attack in which the attacker makes a brute force attack on an administrator-user name such as "admin" of the host provider so as to steal the password. Also, as cyber attacks have become more active, the damage has also become more serious. Against these cyber attacks, a provider managing a communication device that has received an attack responds by taking a countermeasure in which the IP address of the attack source is identified so as to block communications from that address.

A security device called an Intrusion Detection System (IDS) for monitoring cyber attacks is known. As a general rule, an IDS determines whether or not packets flowing in a network are of a pattern of an unusual incident such as a cyber attack, and performs log registration when the packets are of a pattern of an unusual incident. In determining whether or not packets are of a pattern of an unusual incident such as a cyber attack, determination is made based on whether the packets fit into patterns of unusual incidents that are registered beforehand or based on comparisons with past patterns.

Also, a Managed Security System (MSS) is known that is a security system including a security device such as an intrusion detection system and that assists in the operation of the security device by performing pattern analysis of a log collected by the security device etc.

Further, a log analysis device that analyzes a log output from an intrusion detection system is known.

In an example of a log analysis device, first, distribution relating to time values representing arrival intervals or a continued period of events recorded in a past time period is generated and theoretical statistical distribution is generated based on the average value and the standard deviation of the generated distribution. Next, a correlation coefficient is calculated that represents the correlation between the distribution relating to time values of events recorded during a prescribed time period as an analysis target and the theoretical statistical distribution, and determines that the events as analysis targets are unusual when the value of the correlation coefficient is equal to or smaller than a prescribed value.

Also, another log analysis device obtains statistical information as a result of converting, into frequency, event information detected by a security device such as an intrusion detection system (IDS) or a firewall (FW) provided in a network and frequency component information obtained by performing frequency resolution on that statistical information, and determines the occurrence tendency of incidents based on the frequency component. By employing this configuration, efficient characterization is performed on a log of a security device that has recorded one or a plurality of attacks that occurred in a network and an unusual change therein is detected so as to detect a complicated incident. An incident used herein is an event related to computer security.

In another log analysis device, first, a parameter used for analyzing is extracted from a log so as to extract an abnormal value relating to the degree of the abnormality of the network based on the number of events belonging to that parameter. Next, the transition of the number of future events is predicted objectively by calculating conditional probability that a prescribed event will occur when a prescribed condition related to that abnormal value is met. For example, conditional probability that a prescribed incident will occur is calculated. Examples of parameters are Attack Signature, Source/Destination Port and Source/Destination ID, etc., which are recorded in logs output from network devices such as an intrusion detection system, a router, a firewall, etc. Examples of abnormal values are a ratio in ratio analysis, and the upper rarity and the lower rarity in the probability analysis.

In this type of log analysis device, it is in particular possible to detect attacks when the number of attacks is great, such as 100 times per minute, and the same attacking pattern is repeated, for example with the same attack source and same attack target over all attacks. An attack source and an attack target may be specified by an attack source IP address and an attack target IP address.

In recent years, attackers using brute force attacks have used arrangements for avoiding detection by security devices such as an Intrusion Detection System (IDS) etc. by carrying out attacks intermittently on a plurality of attack targets from different attack sources or by reducing the number of times an attack such as a log-in attempt is carried out from a single attack source from the start to the end of the attack. Accordingly, there is a problem wherein a log of a security device has to be analyzed over a long period of time in order to identify attack sources of this type of attack.

PRIOR ART DOCUMENTS

Patent Documents

[Patent Document 1] Japanese Laid-open Patent Publication No. 2005-236862
[Patent Document 2] Japanese Laid-open Patent Publication No. 2006-319633
[Patent Document 3] Japanese Laid-open Patent Publication No. 2005-196675

SUMMARY

According to an aspect of the embodiments, a log analysis device that classifies, based on a log collected from a network device, a plurality of attack target communication devices receiving attacks from an attack source communication device includes a correlation coefficient calculation unit and an extraction unit. The correlation coefficient calculation unit is configured to calculate, based on the log, a correlation coefficient relating to the number of the attacks in a time period during which the attacks were carried out for a combination of the plurality of attack target communication devices, the time period including a detection time at which and the detection period of time during which the network device detected the attack. The extraction unit is configured to extract, as a high-correlation communication device group, a combination of the plurality of attack target communication devices, for which the correlation coefficient is equal to or greater than a prescribed threshold and of which the attack source communication device is identical in the time period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of an output of the log analysis device;

FIG. 9 illustrates an example of data stored in an IDS log database of the intrusion detection system;

FIG. 10 illustrates an example of data stored in an analysis setting database of the log analysis device;

FIG. 11 illustrates an example of data stored in a countermeasure-desired communication device IP address database of the intrusion detection system;

FIG. 12 illustrates an example of log data that the log analysis device receives from the IDS log database of the intrusion detection system;

FIG. 13 illustrates examples of number-of-times-data strings representing data of an attack source (Hacker), the number of attacks, detection time (time), and attack target (attacked communication device (Victim)) generated for each port number by the brute force attack analysis unit;

FIG. 14 illustrates an example of situation where communication devices with a high correlation are extracted by a brute force attack analysis unit;

FIG. 15 illustrates an example of situation where communication devices with a high correlation are extracted by the brute force attack analysis unit;

FIG. 16 illustrates an outline of a maximum clique method;

FIG. 18A illustrates an example of an output from a pair generation unit of the brute force attack analysis unit illustrated in FIG. 17;

FIG. 18B illustrates an example of an output from a clique search unit of the brute force attack analysis unit illustrated in FIG. 17;

FIG. 18C illustrates an example of an output from an output unit of the brute force attack analysis unit illustrated in FIG. 17;

DESCRIPTION OF EMBODIMENTS

Figure 1:
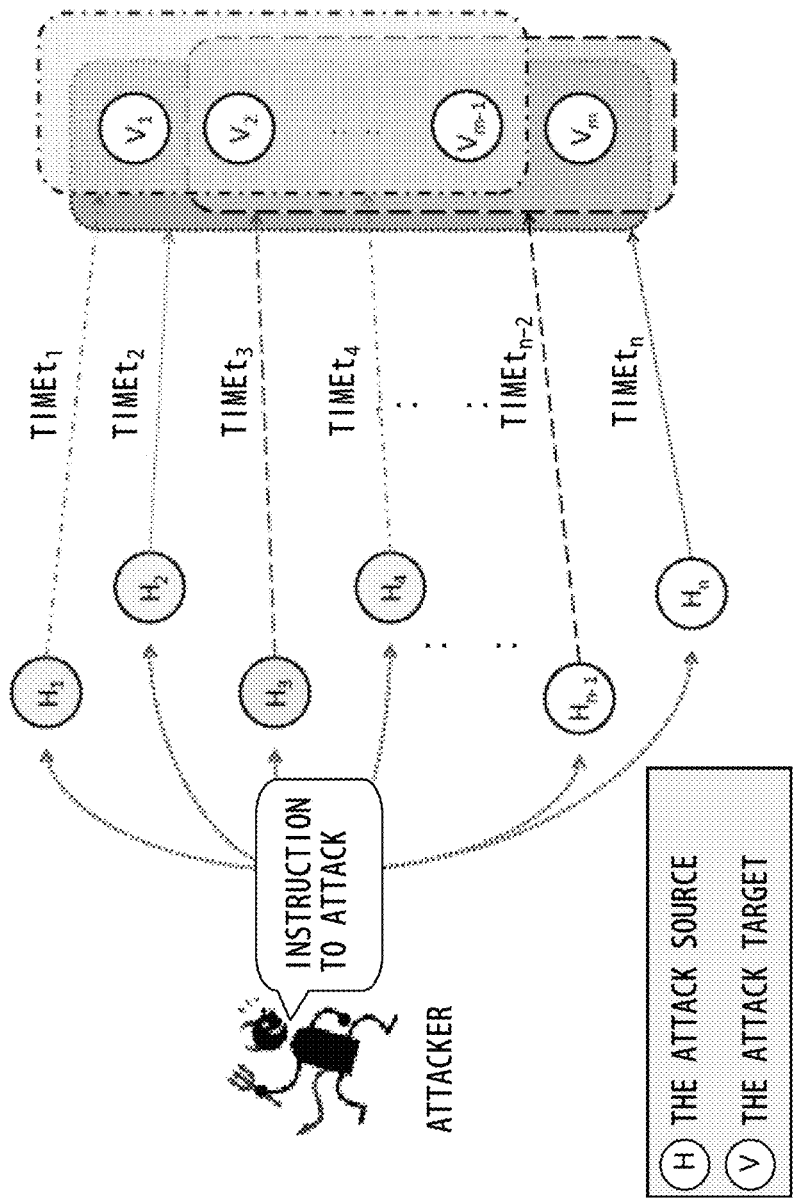
FIG. 1 illustrates an outline of an example of a brute force attack.

Hereinafter, by referring to the drawings, explanations will be given for the outline and later for a log analysis device, a log analysis method, and a log analysis program according to embodiments. A log analysis device, a log analysis method, and a log analysis program according to embodiments are capable of efficiently extracting a communication device that is an attack target from among a plurality of communication devices based on a log.

<Outline>

A brute force attack is an attack in which all possible keys are listed so that decryption of encrypted texts is attempted. For the purpose of carrying out an attack efficiently, there also exists a dictionary attack that looks for words collected in a dictionary as candidates, and a method that uses a value that is set initially in a system. Further, a brute force attack may include an attack in which a large amount of identifiers (IDs) and passwords that are thought to have been leaked from a system are used for logging into a different system.

Hereinbelow, the following technical terms are used.

"Attack source" is a communication device that is a transmission source of a communication carrying out a brute force attack and sometimes refers to the IP address of such a transmission source.

"IP address" used herein is a number for identifying a communication device that performs transmission and reception in communications.

"Attack target" is a communication device that receives a brute force attack and sometimes refers to the IP address of a communication device that receives an attack.

"Victim" is an attack target.

"Detection time" is a time at which an intrusion detection system (IDS), an intrusion prevention system (IPS), etc. detected a brute force attack.

"Number of log-in attempts" can be the number of times that log-in attempt type brute force attacks from an attack source to an attack target were detected during a continuous time period, including a detection time. For example, when an attack target received attacks from an attack source for five minutes starting from a certain time, the number of log-in attempts can be the total number of the attacks in that five minutes. Also, the number of log-in attempts can be the number of times that brute force attacks were detected per a unit of time. For example, the number of log-in attempts can be the number of log-in attempts per one minute. For example, when an attack target received attacks from an attack source for five minutes starting from a certain time, the number of log-in attempts can be the average of the number attacks per one minute. Alternatively, the five minutes can be treated as a period of time in which one-minute attacks were carried out five times. In such a case, the number of log-in attempts can be the average per one minute.

Also, "number of log-in attempts" can sometimes be referred to as the number of attacks.

"Port number" is a port number of a communication device that is an attack target for which an attack was detected.

An intrusion detection system (IDS) is used for countermeasures such as detecting a brute force attack or focused monitoring of accesses to a communication device having a particular IP address. As a general rule, an IDS has the function of identifying an attack source IP address. When an IDS has identified an attack source IP address, the user performs defense such as blocking communications from that IP address, etc.

An intrusion prevention system (IPS) has the function of not only reporting abnormality but also of automatically performing network defense such blocking communications working together with a firewall.

FIG. 1 illustrates the outline of an example of a brute force attack.

In the brute force attack illustrated in FIG. 1, attacks are carried out on a plurality of particular groups of attack targets from an attack source that varies from one detection time to another.

In FIG. 1, for example, at time $t_1$, brute force attacks are carried out on attack targets $V_1, V_2, \ldots, V_{m-1}$ from attack source $H_1$, and at time $t_2$, brute force attacks are carried out on attack targets $V_1, V_2, \ldots, V_m$ from attack source $H_2$. At time $t_3$, brute force attacks are carried out on attack targets $V_2, \ldots, V_m$ from attack source $H_3$, and at time $t_4$, brute force attacks are carried out on attack targets $V_1, V_2, \ldots, V_{m-1}$ from attack source $H_4$; at time $t_{n-1}$, brute force attacks are carried out on attack targets $V_2, \ldots, V_m$ from attack source $H_{n-1}$, and at time $t_n$, brute force attacks are carried out on attack targets $V_1, V_2, \ldots, V_m$ from attack source $H_n$.

Figure 2:
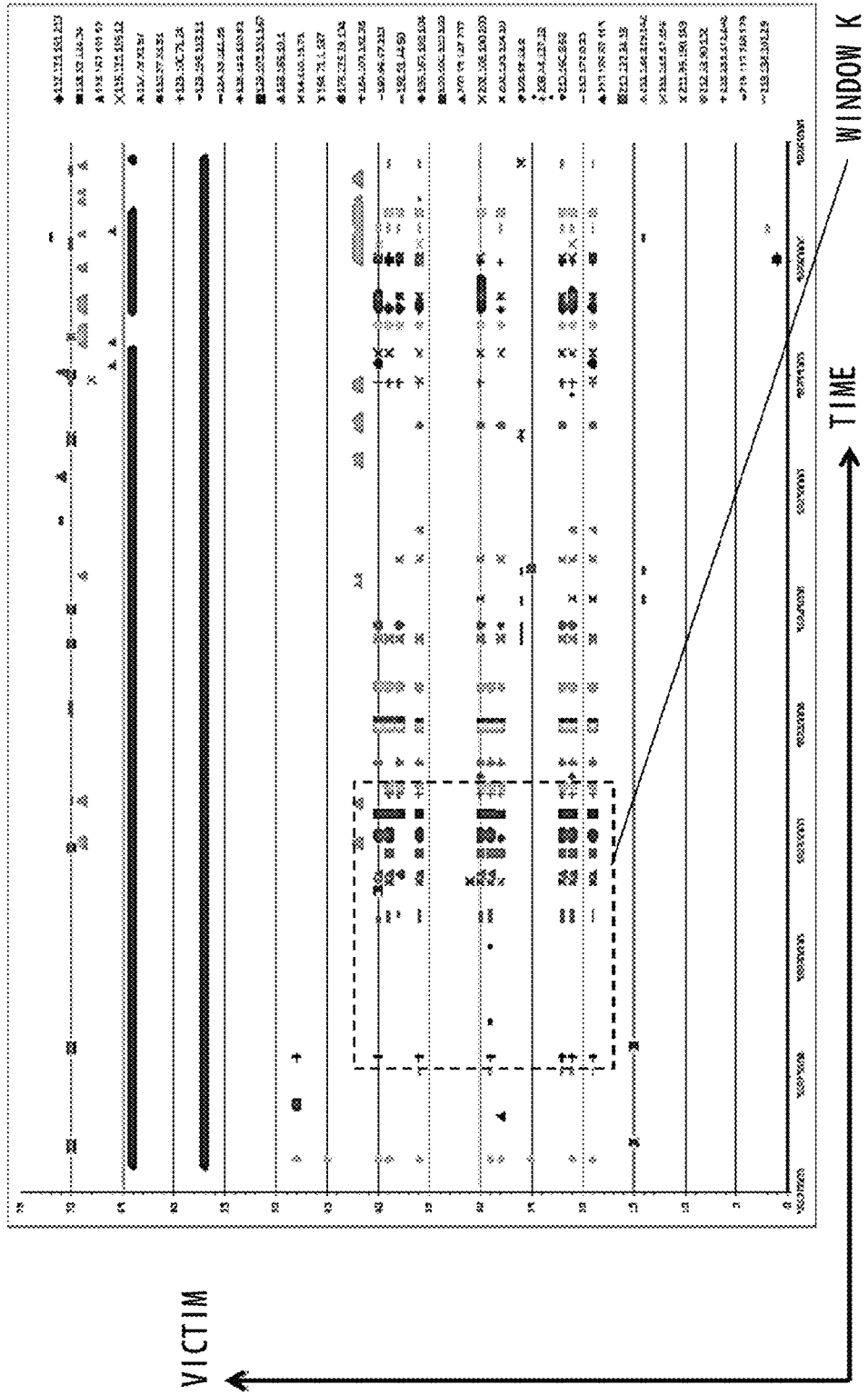
FIG. 2 illustrates an example of a log of a communication device that has received an example of a brute force attack.
Figure 3:
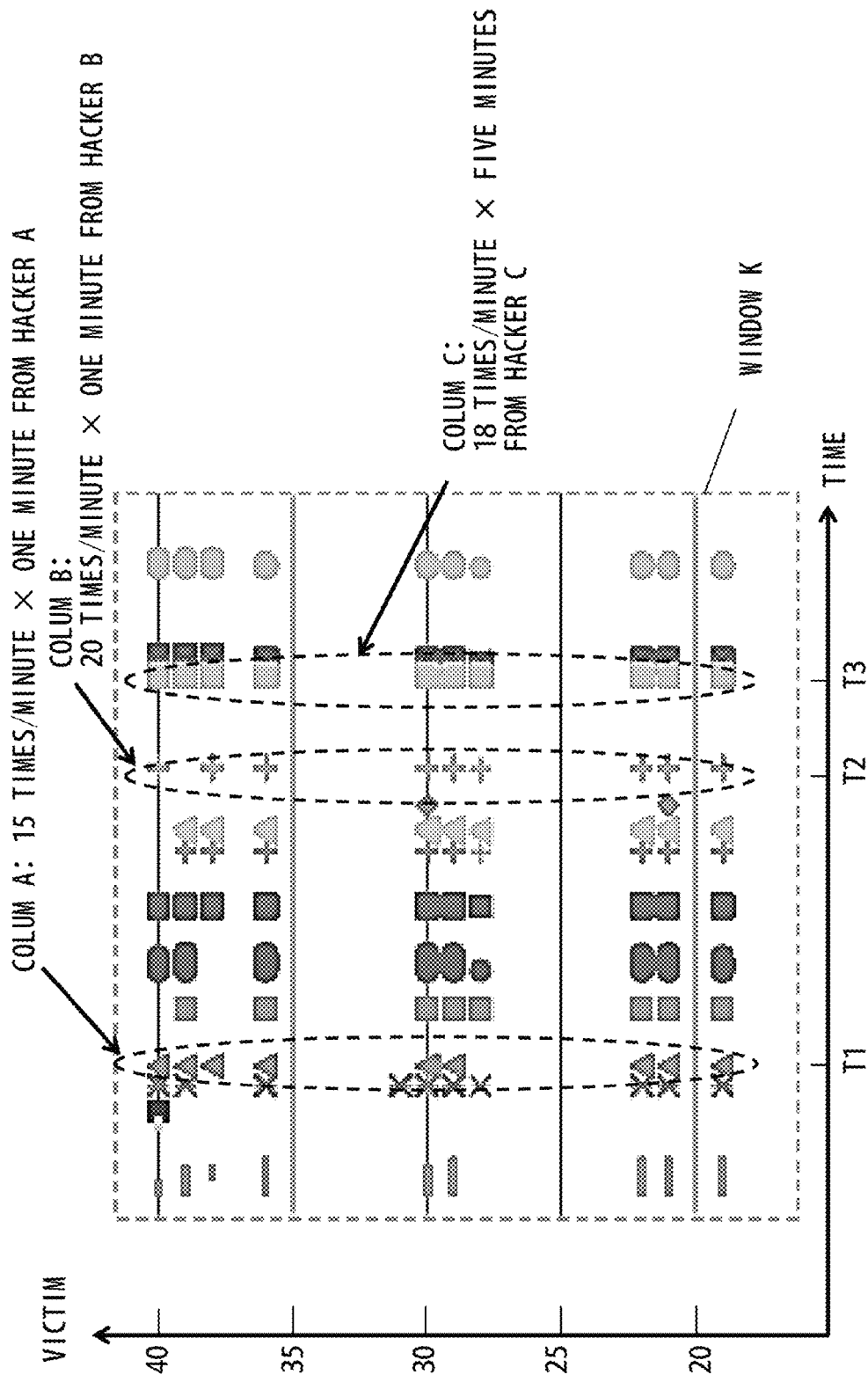
FIG. 3 is an enlarged view illustrating part of the log illustrated in FIG. 2.

FIG. 2 illustrates an example of a log of a communication device that has received an example of a brute force attack. FIG. 3 is an enlarged view illustrating part of the log illustrated in FIG. 2.

Brute force attacks as illustrated in FIG. 1 are seen in a portion denoted by "window K" in FIG. 2.

For example, as illustrated in FIG. 3, at time $T_1$, the communication devices having the communication device (Victim) numbers of 18, 21, 22, 29, 30, 36 and 38 through 40 are receiving brute force attacks (column A) in which log-in attempts of 15 times/minute are carried out from Hacker A (attack source) for one minute. Also, at time $T_2$, the communication devices having the communication device (Victim) numbers of 18, 21, 22, 28 through 30, 36, 38 and 40 are receiving brute force attacks (column B) in which log-in attempts of 20 times/minute are carried out from Hacker B (attack source) for one minute. Also, the communication devices having the communication device (Victim) numbers of 18, 21, 22, 28 through 30, 36 and 38 through 40 are receiving brute force attacks (column C) in which log-in attempts of 18 times/minute are carried out from Hacker C (attack source) for five minutes from time $t_3$.

As described above, the logs illustrated in FIG. 2 and FIG. 3 indicate that brute force attacks were carried out on a plurality of particular attack target groups from an attack source that varies depending upon an attack term. When a log of a communication device that received an attack is examined, this type of brute force attack has the following characteristics in regard to attack source, attack target, the number of log-in attempts, and attack detection time.

In regard to an attack source, n attack source varies from one attack to another. "Attack source varies from one attack to another" may mean that attacks are carried out intermittently on a plurality of attack targets from varying attack sources when viewed from the edge that receives the attacks.

In regard to an attack target, a particular attack target group continuously receives attacks during a relatively long time period from a plurality of attack sources. In an attack target group, there are communication devices that do not receive attacks even though other communication devices received attacks in the attack target group. There may also be attack targets that started receiving attacks in the middle of an attack, attack targets that stopped receiving attacks in the middle of an attack, or attack targets that receive attacks only during a particular time period.

The number of log-in attempts is relatively small. For example, when the average of the log-in attempts in the entirety of the analysis target logs is around 72 times, there may be an average of around 18 times.

Regarding an attack detection time, attacks from one attack source on a attack target group are detected roughly at the same time. However, there are attack targets for which attacks are detected continuously in time and also attack targets for which attacks are not detected in such a way.

As described above, brute force attacks included in window K in the log illustrated in FIG. 1 through FIG. 3 have the following characteristics.

(C1) A plurality of attack targets receive attacks with the same number of log-in attempts at roughly the same time.

(C2) An attack source varies each time an attack is carried out.

(C3) In order to avoid detection by an intrusion detection system (IDS) and an intrusion prevention system (IPS), brute force attacks are carried out with a small number of log-in attempts.

The above characteristics are different from those of the brute force attacks illustrated in FIG. 2.

Figure 4:
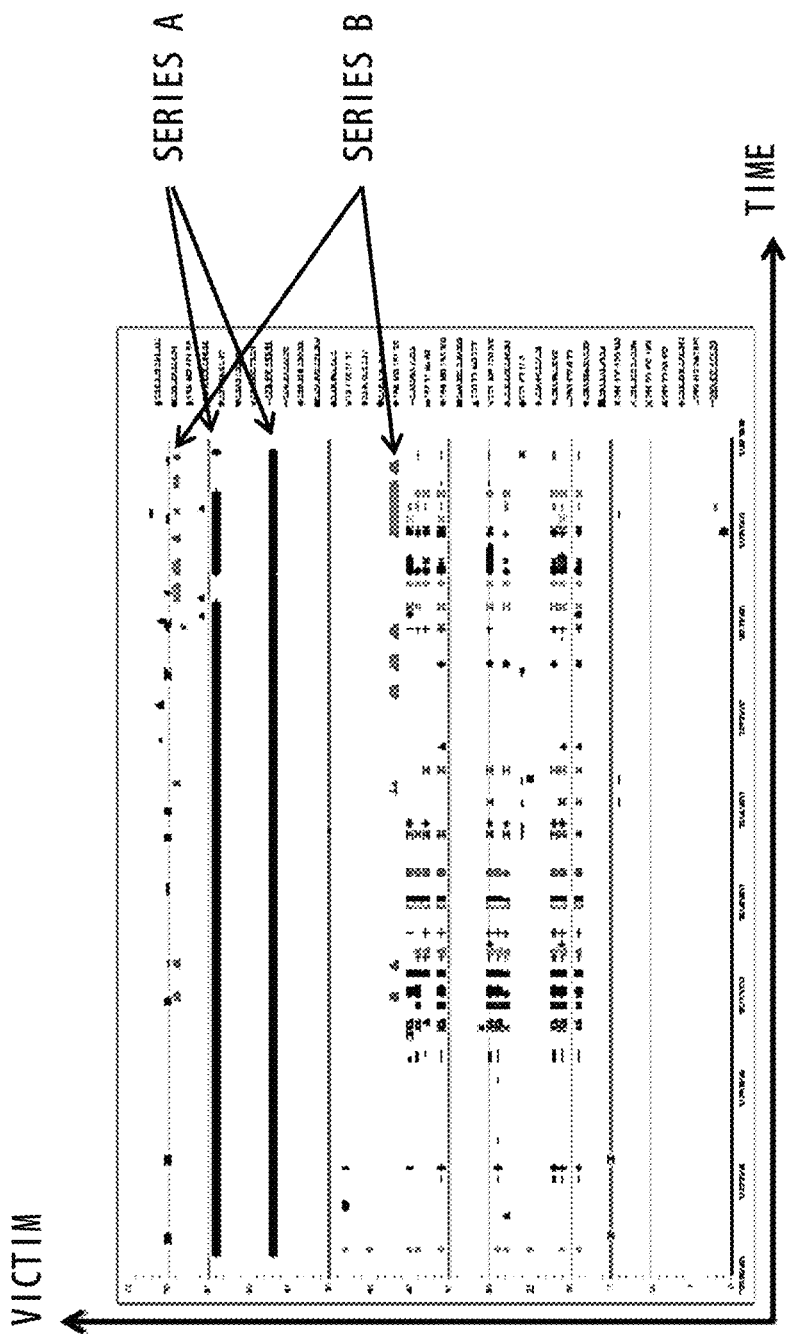
FIG. 4 illustrates an example of a log of a communication device that received another example of a brute force attack.

FIG. 4 illustrates an example of a log of a communication device that received another example of a brute force attack.

FIG. 4 illustrates a situation where particular attack targets receive brute force attacks from attack source A (series A) and different attack targets receive brute force attacks from attack source B, which is a different attack source (series B). In the brute force attacks illustrated in FIG. 4, when the attack source is identified, it is possible to prevent the attacks by blocking communications from that attack source. However, even if a countermeasure is taken against the brute force attacks illustrated in FIG. 1 through FIG. 3, it is to be desired that communication devices receiving such attacks are grouped and identified as an attack target group (Victim group).

Figure 5:
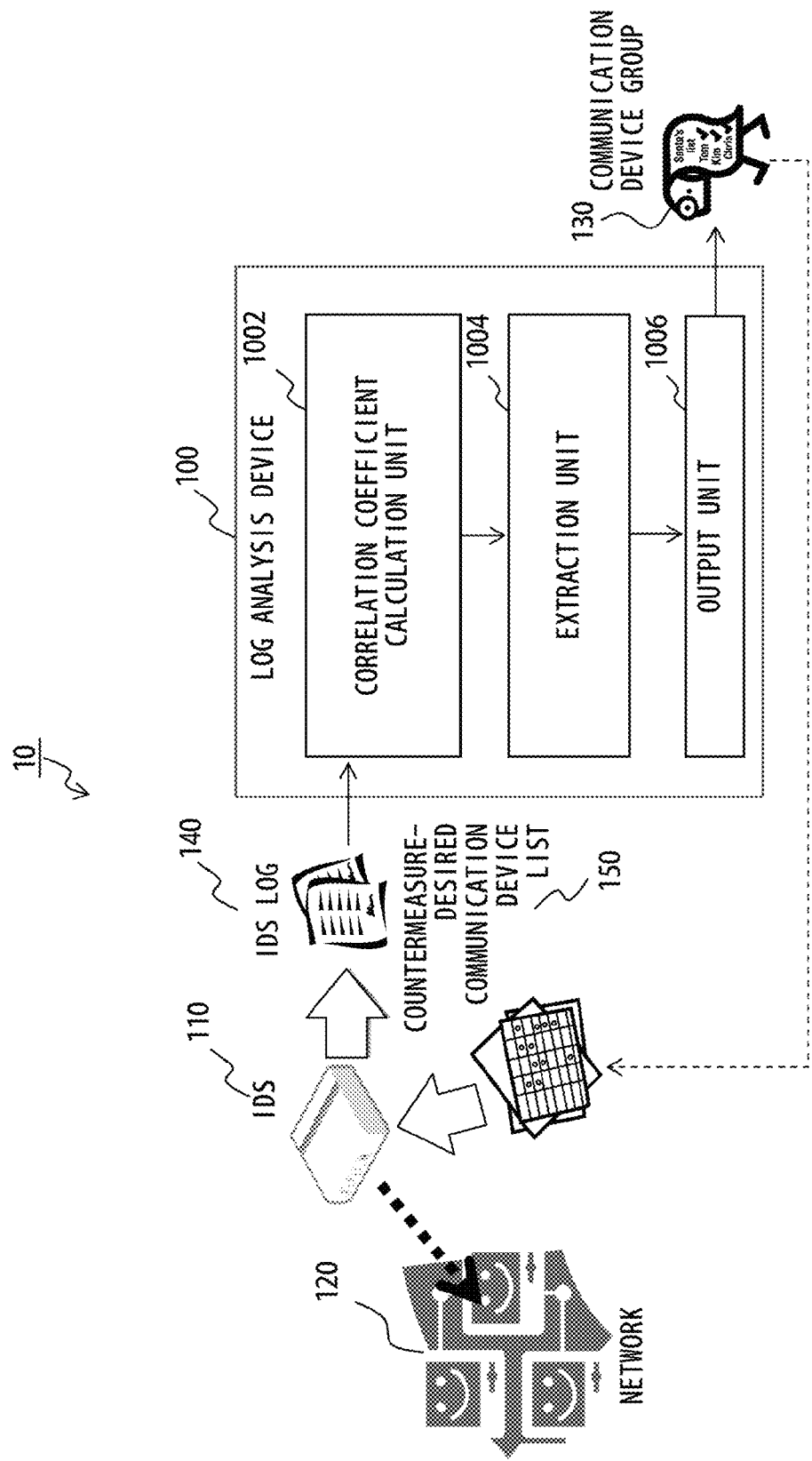
FIG. 5 illustrates an outline of a system including a log analysis device.

FIG. 5 illustrates an outline of a system including a grouping device.

A system 10 includes an intrusion detection system (IDS) 110, and a log analysis device 100 that analyzes an IDS log provided from the intrusion detection system (IDS) 110, groups communication devices that receive attacks, and identifies the group as an attack target group (Victim group). The log analysis device 100 may also be referred to a grouping device.

The intrusion detection system (IDS) 110 is connected to a network 120 and provides an IDS log 140 to the grouping device 100.

The log analysis device 100 includes a correlation coefficient calculation unit 1002, an extraction unit (communication device (Victim) group selection unit) 1004, and an output unit 1006.

The correlation coefficient calculation unit 1002 calculates the correlation coefficient of three of attack sources (Hackers), the number of attacks, and the detection times for a plurality of attack targets (Victims).

The extraction unit 1004 extracts communication devices (Victims) having a high correlation coefficient and identifies the communication devices as an attack target group (Victim group).

The output unit 1006 registers communication devices (Victims) identified by the extraction unit 1004 in a countermeasure-desired communication device list 150, and transmits the countermeasure-desired communication device list 150 to the intrusion detection system (IDS) 110.

The intrusion detection system (IDS) 110 that received the countermeasure-desired communication device list 150 takes a countermeasure for the communication device registered in the countermeasure-desired communication device list 150 such as enhancing the monitoring on log-in attempts.

Also, the extraction unit 1004 extracts, as a high-correlation communication device group, a combination of a plurality of attack target communication devices for which the correlation coefficient is equal to or greater than a prescribed threshold and of which an attack source communication device is the same in each of the terms.

FIG. 6 illustrates an example of an output of the log analysis device.

The table illustrated in FIG. 6 includes attack source (Hacker), detection time, attack target, and the number of log-in attempts.

For example, at 4:00 on November 1, attack source (Hacker) $h_2$ carried out a brute force attack in which log-in attempts were carried out 12 times on communication devices (Victims) $v_1$, $v_2$, $v_3$, $v_4$ and $v_5$. At 4:01 on November 1, attack source (Hacker) $h_2$ carried out a brute force attack in which log-in attempts were carried out 9 or 10 times on communication devices (Victims) $v_1$, $v_2$, $v_3$, $v_4$ and $v_5$ (10 times on $v_1$ and 9 times on the others). At 4:02 on November 1, attack source (Hacker) $h_2$ carried out a brute force attack in which log-in attempts were carried out 3 or 4 times on communication devices (Victims) $v_1$, $v_2$, $v_3$, $v_4$ and $v_5$ (3 times on $v_1$ and 4 times on the others). Also, at 4:03 on November 1, attack source (Hacker) $h_3$ carried out a brute force attack in which log-in attempts were carried out 100 times on communication device (Victim) $v_6$.

In the example illustrated in FIG. 6, the attack carried out by attack source (Hacker) $h_2$ is the brute force attack as illustrated in FIG. 1 through FIG. 3. The attack carried out by attack source (Hacker) $h_3$ is a brute force attack as illustrated in FIG. 4. Accordingly, communication devices (Victims) $v_1$, $v_2$, $v_3$, $v_4$ and $v_5$ are identified as a communication device (Victim) group that has a high possibility of receiving a brute force attack in which varying attack sources intermittently carry out attacks on a plurality of attack targets. Also, the attack carried out by attack source (Hacker) $h_3$ on communication device (Victim) $v_6$ is not the brute force attack as illustrated in FIG. 1 through FIG. 3.

As described above, the log analysis device 100 classifies a plurality of attack target communication devices that receive attacks from an attack source communication device based on logs collected from network devices such as the intrusion detection system (IDS) 110 etc.

The correlation coefficient calculation unit 1002 of the log analysis device 100 may calculate a correlation coefficient relating to the number of attacks in a time period of attacks including a detection time and a detection period of time at which and during which a network device such as the intrusion detection system (IDS) 110 or the like detected an attack, for a combination of a plurality of attack target communication devices.

The extraction unit 1004 of the log analysis device 100 may be referred to as the communication device (Victim) group selection unit 1004 or the high-correlation communication device group selection unit 1004.

The extraction unit 1004 may extract as a high-correlation communication device group a combination of a plurality of attack target communication devices having a correlation coefficient equal to or greater than a prescribed threshold and having the same attack source communication device during a time period.

The output unit 1006 may output information relating to a high-correlation communication device group to a network device such as the intrusion detection system (IDS) 110 or the like. A network device such as the intrusion detection system (IDS) 110 or the like that received information relating to a high-correlation communication device group can perform focused monitoring of accesses to IP addresses of the high-correlation communication device group so as to prepare for attacks.

Attacks are carried out intermittently over a plurality of time periods, and there are a plurality of detection times, and each of the plurality of time periods may include one of the plurality of detection times that are different from each other. In such a case, the correlation coefficient calculation unit 1002 may calculate a correlation coefficient relating to the number of attacks in each of the plurality of detection times and a plurality of time periods of an attack which was detected by a network device such as the intrusion detection system (IDS) 110 or the like for a combination of a plurality of attack target communication devices based on the logs.

The extraction unit 1004 may extract a high-correlation communication device group by extracting a clique from a graph including an edge given between the vertex corresponding to the information relating to the number of attacks carried out during a time period of attacks including detection times and detection periods of time of attacks which a plurality of attack target communication devices received and the vertexes corresponding to two of the plurality of attack target communication devices having a correlation coefficient equal to or greater than a prescribed threshold. As described above, the extraction unit 1004 may employ a method based on a graph theory such as a maximum clique method or the like.

Also, the log analysis device 100 may perform, based on a log, classification (grouping) of communication devices targeting only communication devices that received brute force attacks.

Employing the above configuration leads to the following effects.

(E1) It is possible to identify a communication device (Victim) group having a high probability of receiving an attack in the future even without collecting logs during a long period of time.

(E2) By performing focused monitoring on an identified communication device (Victim) group, it is possible to prompt countermeasures against a brute force attack.

(E3) Because the countermeasure-desired communication device list 150 can be updated on an as-needed basis, it is possible to trace changes in an attack target group. For example, when there is a communication device that has been removed from the countermeasure-desired communication device list 150 from a particular time, it is possible to assume a change such as that the attacker removed that communication device from the attack target scope for some reason or the attack succeeded and a brute force attack has become unnecessary.

<Intrusion Detection System (IDS) and Log Analysis Device>

Figure 7:
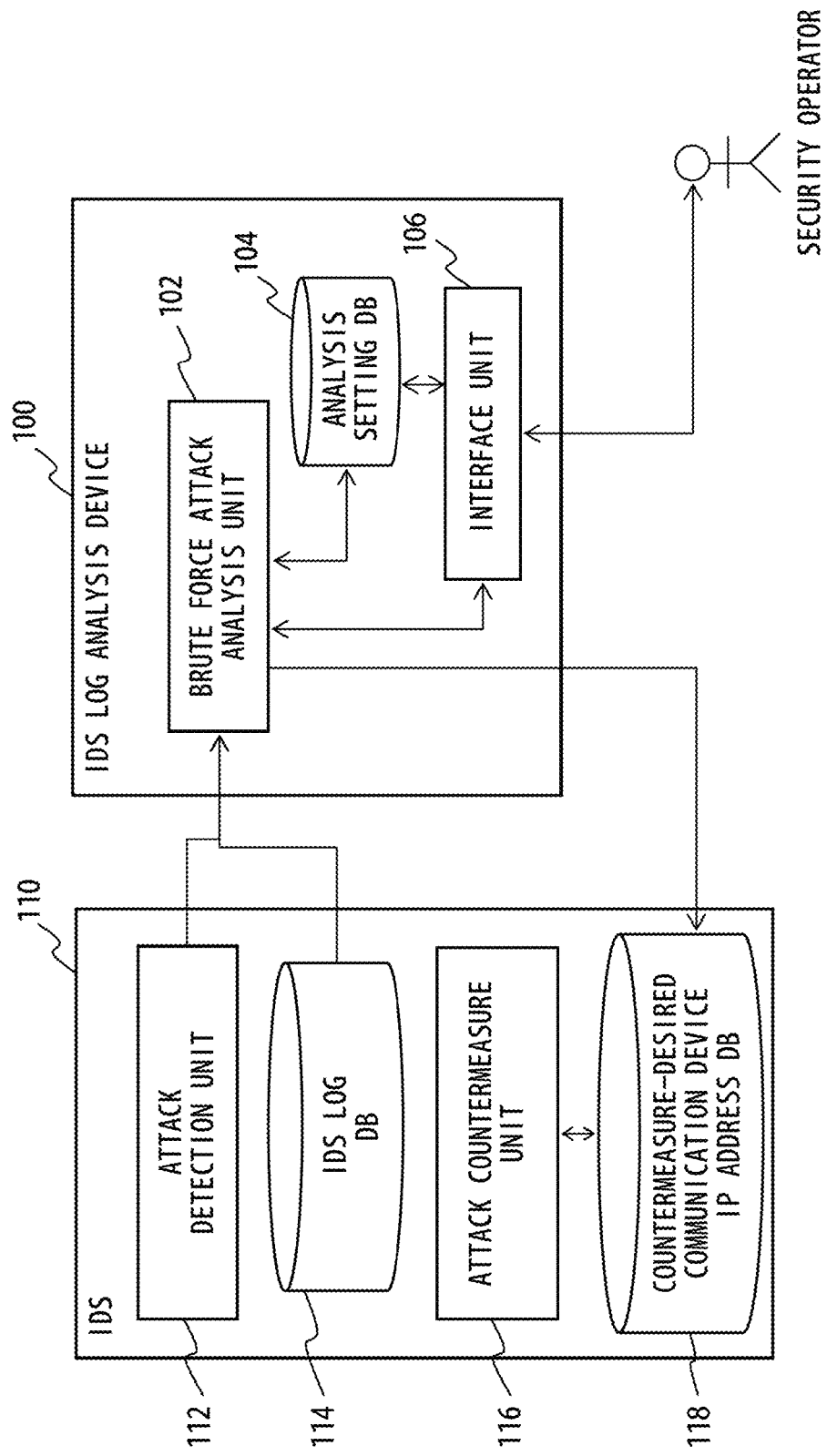
FIG. 7 illustrates an example of a functional block diagram of an intrusion detection system and the log analysis device.

FIG. 7 illustrates an example of a functional block diagram of the intrusion detection system (IDS) 110 and the log analysis device 100.

The log analysis device 100 illustrated in FIG. 7 is a log analysis device that is combined with the intrusion detection system (IDS) 110 so as to group communication devices that receive brute force attacks having characteristics (C1) through (C3) above in order to respond to such brute force attacks. It is possible to attain effects (E1) through (E3) above.

In FIG. 7, the log analysis device 100 is a device separate from the intrusion detection system (IDS) 110. However, the log analysis device 100 may be incorporated into the intrusion detection system (IDS) 110.

The intrusion detection system (IDS) 110 includes an attack detection unit 112, an IDS log database (DB) 114, an attack countermeasure unit 116, and a countermeasure-desired communication device (Victim) IP address database (DB) 118.

The attack detection unit 112 of the intrusion detection system (IDS) 110 is connected to for example the network 120 as illustrated in FIG. 5, detects a packet which is related to a brute force attack and which flows in the network 120, and issues an event indicating an abnormality to the log analysis device 100.

The IDS log database (DB) 114 of the intrusion detection system (IDS) 110 stores information on a packet which is related to a brute force attack and which is detected by the attack detection unit 112.

FIG. 9 illustrates an example of data stored in the IDS log database (DB) 114 of the intrusion detection system (IDS) 110.

As illustrated in FIG. 9, data stored in the IDS log database (DB) 114 includes attack source (Hacker), attack target (Victim), detection time, number of log-in attempts (number of attacks), and port of an attack target (Port).

From for example data illustrated in FIG. 9, it is understood that a brute force attack including 30 log-in attempts was carried out on port number (Port) "22" of an attack target (Victim) having IP address "55.66.77.88" from an attack source having IP address "11.22.33.44" at detection time "0:00 on Apr. 1, 2013".

The log analysis device 100 identifies, as a countermeasure-desired communication device (Victim) IP address, the IP address of a communication device that is assumed to be an attack target of the brute force attack based on data stored in the IDS log database (DB) 114 of the intrusion detection system (IDS) 110. Specifically, based on data stored in the IDS log database (DB) 114, the log analysis device 100 calculates a correlation coefficient of three of attack source (Hacker), the number of attacks, and detection time for a plurality of attack targets (Victims). As a method of calculating a correlation coefficient, for example a maximum clique method may be used. Then, communication devices (Victims) with high correlation coefficients are extracted so as to identify such devices as a communication device group (Victim group). This communication device group may also be referred to as an attack target group in some cases.

Figure 8:
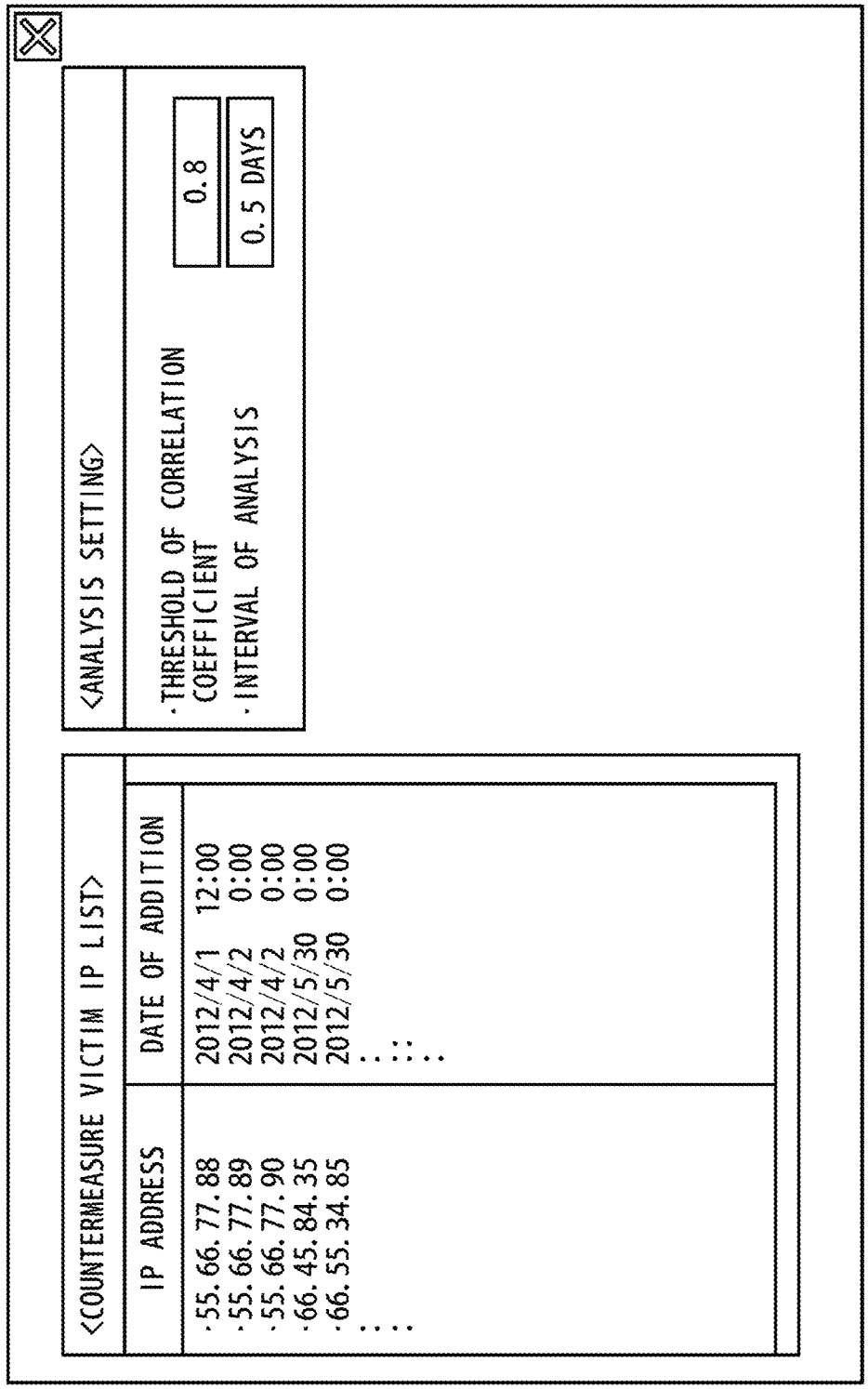
FIG. 8 illustrates an example of a screen output from an interface unit of the log analysis device.

FIG. 8 illustrates an example of a screen output from a log analysis device.

As illustrated in FIG. 8, IP addresses that are candidates for attack targets of brute force attacks are displayed with the dates (dates of addition) on which those IP addresses are recognized as attack targets.

In the example illustrated in FIG. 8, it is shown that IP address "55.66.77.88" was recognized as a candidate for an attack target at 12:00 on Apr. 1, 2013.

In the example illustrated in FIG. 8, the field of "<Analysis setting>" includes a threshold of a correlation coefficient when an attack target group (Victim group) is identified and a time period of log data used for the analysis.

The countermeasure-desired communication device (Victim) IP address database (DB) 118 of the intrusion detection system (IDS) 110 stores a countermeasure-desired communication device (Victim) IP address identified by the log analysis device 100 together with the date (date of addition) on which that IP address was recognized as a candidate for an attack target.

FIG. 11 illustrates an example of data stored in the countermeasure-desired communication device (Victim) IP address database (DB) 118 of the intrusion detection system (IDS) 110. Data stored in the countermeasure-desired communication device (Victim) IP address database (DB) 118 corresponds to the countermeasure-desired communication device list 150 illustrated in FIG. 5.

In the example illustrated in FIG. 11, the countermeasure-desired communication device (Victim) IP address database (DB) 118 stores for example data indicating that IP address "55.66.77.88" was recognized as an attack target at 12:00 on Apr. 1, 2013.

The attack countermeasure unit 116 of the intrusion detection system (IDS) 110 takes a countermeasure against communications from an attack source which is included in a list stored in the countermeasure-desired communication device (Victim) IP address database (DB) 118. For example, the attack countermeasure unit 116 may issue an alert (warning) when a log-in attempt was carried out on a countermeasure-desired communication device (Victim). Also, the attack countermeasure unit 116 may block communications to a countermeasure-desired communication device (Victim).

The log analysis device 100 includes a brute force attack analysis unit 102, an analysis setting database (DB) 104, and an interface unit 106.

The brute force attack analysis unit 102 of the log analysis device 100 has a combined function of the correlation coefficient calculation unit 1002 and the extraction unit 1004 which are illustrated in FIG. 5. In other words, the IP address of a communication device assumed to be an attack target of a brute force attack is identified as a countermeasure-desired communication device (Victim) IP address based on data stored in the IDS log database (DB) 114 of the intrusion detection system (IDS) 110. Specifically, the log analysis device 100 calculates a correlation coefficient of three of attack source (Hacker), the number of attacks, and detection time for a plurality of attack targets (Victims). As a method of calculating a correlation coefficient relating to an attack source, the number of attacks and detection time, a maximum clique method may for example be used. Then, communication devices (Victims) with high correlation coefficients are extracted so as to identify such communication devices as an attack target group (Victim group, communication device group).

The analysis setting database (DB) 104 of the log analysis device 100 stores a parameter used when the brute force attack analysis unit 102 calculates a correlation coefficient, extracts communication devices (Victims) with a high correlation coefficient, and identifies the communication devices as an attack target group (Victim group).

FIG. 10 illustrates an example of data stored in the analysis setting database 104 of the log analysis device 100.

As illustrated in FIG. 10, data stored in the analysis setting database 104 includes a threshold of a correlation coefficient used when an attack target group (Victim group) is identified and a time period (interval of analysis) of log data used for analysis. In the example illustrated in FIG. 10, the threshold of a correlation coefficient is 0.8 and the interval of analysis is 0.5 days.

Correlation coefficient R may be defined by following expression (1).

$$R = \frac{\sum_{i=1}^{n}(x_i - x_{av})(t_i - t_{av})}{\sqrt{\sum_{i=1}^{n}(x_i - x_{av})}\sqrt{\sum_{i=1}^{n}(t_i - t_{av})}} \quad (1)$$

In the above expression, $x_i$ represents the number of brute force attacks that communication device $v_i$ received, $t_i$ represents detection time, $x_{av}$ represents the average of the number of brute force attacks $x_i$, and $t_{av}$ represents the average of detection times $t_i$. The number of brute force attacks may be the number of log-in attempts per one minute.

The interface unit 106 of the log analysis device 100 displays information on the attack target of the brute force attack identified by the brute force attack analysis unit 102. An example of an output from the interface unit 106 is illustrated in FIG. 8. Data stored in the analysis setting database 104 is used as an output in the field of "<Analysis setting>" in the example of an output from the interface unit 106 illustrated in FIG. 8.

The interface unit 106 of the log analysis device 100 transmits, to the log analysis device 100, information on the attack target of the brute force attack identified by the brute force attack analysis unit 102. This information on the attack target of the brute force attack corresponds to the countermeasure-desired communication device list 150 illustrated in FIG. 5. Information included in the countermeasure-desired communication device list 150 is stored in the countermeasure-desired communication device (Victim) IP address database (DB) 118 of the intrusion detection system (IDS) 110.

<Functions of a Brute Force Attack Analysis Unit>

Explanations will be given for functions of the brute force attack analysis unit 102 of the log analysis device 100.

In the brute force attack analysis unit 102 of the log analysis device 100, data stored in the IDS log database (DB) 114 of the log analysis device 100 is first obtained. Then, based on that data, a number-of-times-data string relating to an attack source (Hacker), attack target (Victim), detection time, number of log-in attempts (number of attacks), and port of an attack target (Port) is generated.

FIG. 12 illustrates an example of a log data received from the IDS log database (DB) 114 of the intrusion detection system 110. Similarly to FIG. 9, data stored in the IDS log database (DB) 114 illustrated in FIG. 12 includes attack source (Hacker), attack target (Victim), detection time, number of log-in attempts (number of attacks) and port of an attack target (Port).

From data illustrated in FIG. 12 for example, it is understood that a brute force attack including 30 log-in attempts was carried out on port number (Port) "22" of an attack target (Victim) having IP address "55.66.77.88" from an attack source (Hacker) having IP address "11.22.33.44" at detection time "0:00 on Apr. 1, 2013".

Next, the brute force attack analysis unit 102 of the log analysis device 100 rewrites information of when (time) a brute force attack was carried out by what attack source (Hacker) on what attack target (attacked communication device (Victim)) for each port from the data illustrated in FIG. 12.

FIG. 13 illustrates examples of number-of-times-data strings representing data of an attack source (Hacker), the number of attacks, detection time (time) and attack target (attacked communication device (Victim)), which are generated for each port number by the brute force attack analysis unit.

From examples of number-of-times-data strings illustrated in FIG. 13 for example, it is understood that a brute force attack including 12 log-in attempts was carried out on attack targets (Victims) having IP addresses "11.22.33.44", "2.22.33.44", "3.22.33.44", "4.22.33.44", and "5.22.33.44" from an attack source (Hacker) having IP address "11.22.33.44" at detection time "4:00 on Nov. 1, 2013". Also, the attack source of IP address "11.22.33.44" carried out a brute force attack of 9 or 10 log-in attempts on attack targets having IP addresses "11.22.33.44", "2.22.33.44", "3.22.33.44", "4.22.33.44", and "5.22.33.44" at detection time "4:01 on Nov. 1, 2013" and carried out a brute force attack of 3 or 4 log-in attempts on the same attack targets at detection time "4:02 on Nov. 1, 2013".

Next, the brute force attack analysis unit 102 of the log analysis device 100 extracts a high-correlation communication device (Victim) group relating to the number of times, detection times, and attack sources (Hackers). This utilizes characteristic (C1) among the characteristics of a brute force attack, in which a plurality of different attack sources carry out brute force attacks on a plurality of attack targets and the number of times a brute force attack such as a log-in attempt is carried out by a single attack source from the beginning to the end of an attack is small, i.e.:

(C1) A plurality of attack targets receive attacks with the same number of log-in attempts at roughly the same time.
(C2) An attack source varies each time an attack is carried out.
(C3) In order to avoid detection by an intrusion detection system (IDS) or an intrusion prevention system (IPS), a brute force attack is carried out with a small number of log-in attempts.

To extract a high-correlation communication device group for the number of attempts and detection times, a maximum clique method may be used.

FIG. 14 illustrates an example of situation where communication devices with a high correlation are extracted by a brute force attack analysis unit 1024.

In the example of the number-of-times-data strings illustrated in for example FIG. 14, the three communication devices with IP addresses "11.22.33.44", "2.22.33.44", and "3.22.33.44" received brute force attacks of 12 log-in attempts, 9 or 10 log-in attempts, and 3 or 4 log-in attempts at detection times "4:00 on Nov. 1, 2013", "4:01 on Nov. 1, 2013", and "4:02 on Nov. 1, 2013".

Then, the brute force attack analysis unit 102 selects the three communication devices having IP addresses "11.22.33.44", "2.22.33.44" and "3.22.33.44" as candidates for attack target communication devices (Victims) with a high correlation.

FIG. 15 illustrates an example of situation where communication devices with a high correlation are extracted by the brute force attack analysis unit. The attack sources of the brute force attacks that the communication devices having IP addresses "11.22.33.44", "2.22.33.44", and "3.22.33.44" received are the communication device having the IP address "11.22.33.44".

Accordingly, the brute force attack analysis unit 102 outputs the communication devices with the IP addresses "11.22.33.44", "2.22.33.44", and "3.22.33.44" as communication devices (Victims) with a high correlation.

As described above, it is possible to extract a high-correlation communication device (Victim) group relating to the number of attempts, detection times and attack sources (Hackers).

Explanations will now be given for a method of extracting a high-correlation communication device (Victim) group relating to the number of attempts and detection times by using a maximum clique method.

A maximum clique problem is a type of a combination optimization problem in which a graph with the maximum size is extracted from among complete graphs of subgraphs in a non-directed graph.

First, technical terms are defined.

"Clique" is a vertex set that induces a complete graph. A complete graph is a graph having an edge between two arbitrary vertexes.

"Maximum clique" is the clique with the greatest number of vertexes in a graph.

A maximum clique method is a method of finding the maximum clique from among cliques of a graph. One of the algorithms first finds a candidate nodal point set. A "candidate nodal point set" is a set of vertexes that are still a clique even when the set of vertexes is added to a clique held at a certain point in time. Vertexes in a candidate nodal point set are added to a clique, and a clique that has one more vertex is created. By repeating this process, the maximum clique is found.

FIG. 16 illustrates an outline of a maximum clique method.

In the graph illustrated in FIG. 16, six vertexes, denoted by 1 through 6, are included. Vertex 1 is connected to vertexes 2 and 5 by edges, vertex 2 is connected to vertexes 1, 3, and 5 by edges, vertex 3 is connected to vertexes 2 and 4 by edges, vertex 4 is connected to vertexes 3, 5, and 6 by edges, and vertex 5 is connected to vertexes 1, 2, and 4 by edges.

In the graph illustrated in FIG. 16, the clique having vertexes 1, 2 and 5 is the maximum clique.

In order to apply a problem in which communication devices (Victims) with a high correlation coefficient are extracted so as to identify the communication devices as an attack target group (Victim group), communication devices (Victims) that received brute force attacks are assigned to the respective vertexes. Further, data relating to the number of log-in attempts of brute force attacks that the communication devices received, the detection times, and the attack sources (Hackers) is made to correspond to the respective vertexes.

In regard to whether or not an inter-vertex is connected by an edge, when correlation relating to two of the number of brute force attacks that two communication devices (Victims) received and the detection times is calculated, and the calculated correlation is equal to or greater than a prescribed threshold, the two vertexes are connected by an edge. The number of brute force attacks may be the number of log-in attempts per unit of time. A unit of time may be one minute.

For example, in order to obtain a correlation coefficient of vertex i (i=1 through n) to which communication device $v_i$ has been assigned, the following method may be used.

For example, it is possible to calculate correlation coefficient $R_2$ of vertex 1 to which communication device $v_1$ has been assigned and vertex 2 to which communication device $v_2$ has been assigned so as to determine whether or not to connect vertexes 1 and 2 by an edge according to whether or not the calculated correlation coefficient is equal to greater than a threshold.

Correlation coefficient $R_2$ may be defined as the following expression (2), where $x_i$ represents the number of brute force attacks that communication device $v_i$ (i=1, 2) received and $t_i$ represents the detection time.

$$R_2 = \frac{\sum_{i=1}^{2} (x_i - x_{av})(t_i - t_{av})}{\sqrt{\sum_{i=1}^{2} (x_i - x_{av})^2} \sqrt{\sum_{i=1}^{2} (t_i - t_{av})^2}} \quad (2)$$

In the above expression, $x_{av}$ represents the average of the number of brute force attacks $x_i$ and the $t_{av}$ represents the average of detection times $t_i$.

Alternatively, when the difference of number $x_i$ of brute force attacks and the difference of detection times $t_i$ are both within a prescribed range where the number of brute force attacks that communication device $v_i$ received is $x_i$ and the detection time is $t_i$, it is also possible to connect by an edge vertexes to which communication devices $v_i$ are assigned.

Figure 17:
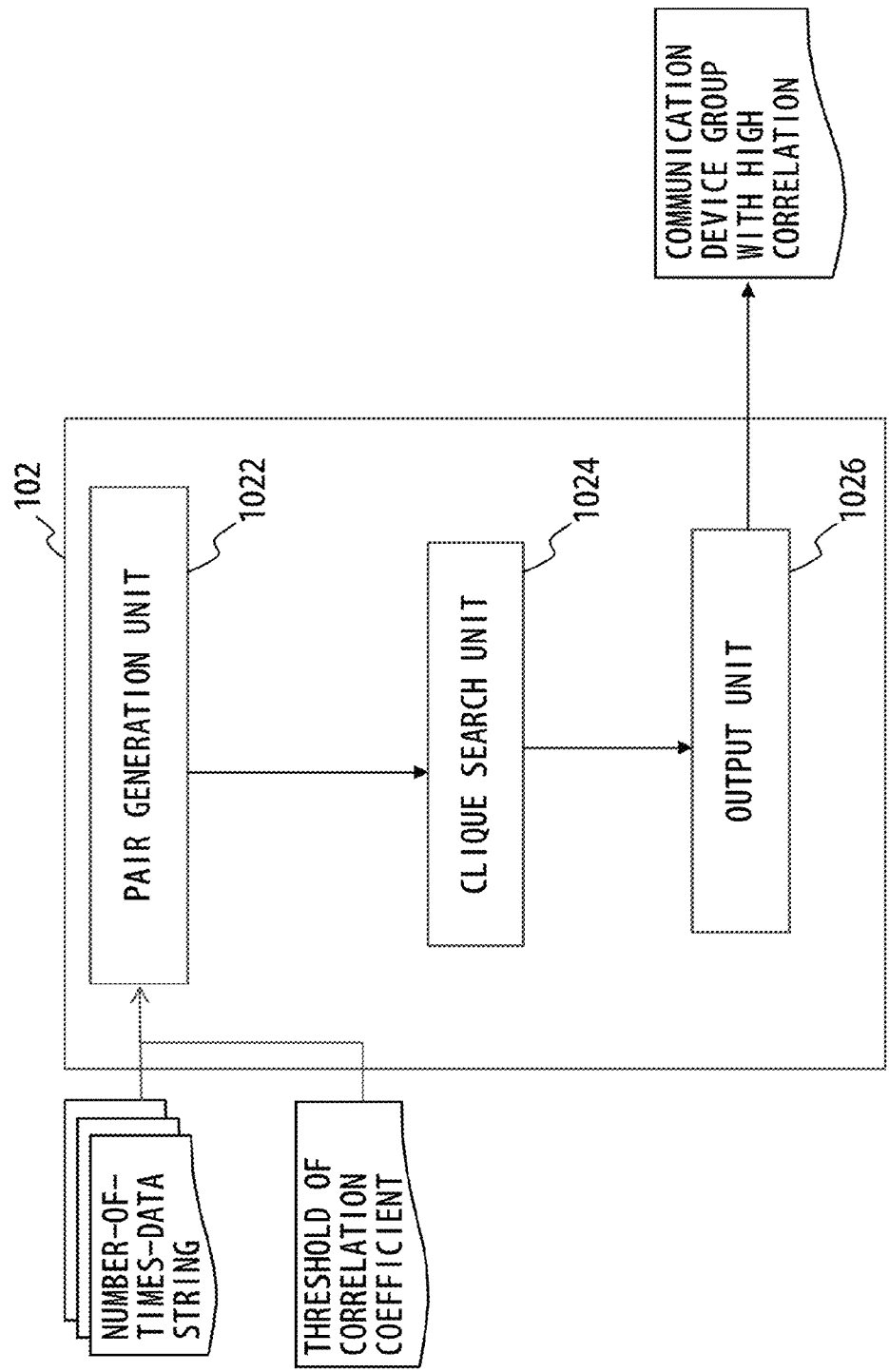
FIG. 17 illustrates an example of a functional block diagram of the brute force attack analysis unit that uses a maximum clique method.

FIG. 17 illustrates an example of a functional block diagram of the brute force attack analysis unit 102 that uses a maximum clique method.

The brute force attack analysis unit 102 illustrated in FIG. 17 includes a pair generation unit 1022, a clique search unit 1024, and an output unit 1026.

The pair generation unit 1022 of the brute force attack analysis unit 102 generates a pair of communication devices (Victims) having a high correlation, i.e., communication devices having correlation coefficients that are equal to or greater than a threshold. As a threshold for correlation coefficients, a value stored in the analysis setting database 104 may be used.

First, the pair generation unit 1022 of the brute force attack analysis unit 102 obtains data stored in the IDS log database (DB) 114 of the log analysis device 100. Next, the pair generation unit 1022 generates a number-of-times-data string in relation to attack sources (Hacker), attack targets (Victims), detection times, the number of log-in attempts (the number of attacks), and ports of attack targets (Ports). Thereafter, the pair generation unit 1022 generates a pair of communication devices (Victims) having a high correlation in relation to the detection times and the number of log-in attempts (number of attacks).

In a graph, a pair of communication devices (Victims) is expressed by the connection, by an edge, of vertexes to which the communication devices are respectively assigned.

FIG. 18A illustrates an example of an output from the pair generation unit 1022 of the brute force attack analysis unit illustrated in FIG. 17.

In the example illustrated in FIG. 18A, the communication device specified by victim1 and the communication device specified by victim2 form a pair. Also, the communication device specified by victim10 forms a pair together with communication devices specified by victim13 and victim14. Further, the communication device specified by victim13 and the communication device specified by victim14 form a pair.

The above situation forms the following graphs. First, the vertex to which victim1 is assigned and the vertex to which victim2 is assigned are connected by an edge, and the vertex to which victim10 is assigned, the vertex to which victim13 is assigned, and the vertex to which victim14 is assigned form a complete graph.

The clique search unit 1024 of the brute force attack analysis unit 102 finds vertexes that form a clique from a graph representing pairs of communication devices (Victims) formed by the pair generation unit 1022. The clique search unit 1024 of the brute force attack analysis unit 102 may find vertexes that form a maximum clique.

FIG. 18B illustrates an example of an output from the clique search unit 1024 of the brute force attack analysis unit 102 illustrated in FIG. 17.

When results of the pair generation unit 1022 are used in the above example, the vertex corresponding to victim1 and the vertex corresponding to victim2 form one clique in the graph including the vertexes corresponding to victim1, victim2, victim10, victim13, and victim14. Also, the vertexes corresponding to victim10, victim13 and victim14 form one clique. When vertexes constituting the maximum clique are to be found, the clique including the vertexes corresponding to victim10, victim13, and victim14 is the maximum clique.

Then, the clique search unit 1024 treats a communication device group corresponding to the vertexes constituting the clique as candidates for attack target communication devices (Victims) having a high correlation.

The output unit 1026 of the brute force attack analysis unit 102 determines whether or not an attack source from which candidates for attack target communication devices (Victims) with a high correlation, selected by the clique search unit 1024, received is identical. When the attack source is identical, the candidates are recognized as an attack target communication devices (Victims) group with a high correlation. An attack target communication devices (Victims) group with a high correlation may also be referred to as a high-correlation communication device group in some cases.

FIG. 18C illustrates an example of an output from the output unit 1026 of the brute force attack analysis unit 102 illustrated in FIG. 17.

The communication device (Victim) group including the communication devices specified by victim1 and victim2 and the communication device (Victim) group including communication devices specified by victim10, victim13, and victim14 are output as high-correlation attack target communication device (Victim) groups.

As another method, it is also possible to search for a combination of communication devices $v_i$ that leads to a correlation coefficient R equal to or greater than a prescribed threshold by defining correlation coefficient R as below when $x_i$ represents the number of brute force attacks that communication device $v_i$ received and $t_i$ represents detection time.

$$R = \frac{\sum_{i=1}^{n}(x_i - x_{av})(t_i - t_{av})}{\sqrt{\sum_{i=1}^{n}(x_i - x_{av})}\sqrt{\sum_{i=1}^{n}(t_i - t_{av})}} \quad (3)$$

In the above expression, $x_{av}$ represents the average of the numbers of brute force attacks $x_i$ and $t_{av}$ represents the average of detection times $t_i$.

The pair generation unit 1022 and the clique search unit 1024 of the brute force attack analysis unit 102 illustrated in FIG. 17 correspond to the correlation coefficient calculation unit 1002 and the extraction unit 1004 illustrated in FIG. 5.

The output unit 1026 of the brute force attack analysis unit 102 illustrated in FIG. 17 corresponds to the output unit 1006 illustrated in FIG. 5.

By employing the above configuration, it is possible for the log analysis device 100 to identify a communication device that receives a brute force attack in which varying attack sources intermittently attack a plurality of attack targets, and to identify a communication device that receives such an attack by analyzing a log of a security device over a short period of time in order to take a countermeasure against such an attack.

Figure 19:
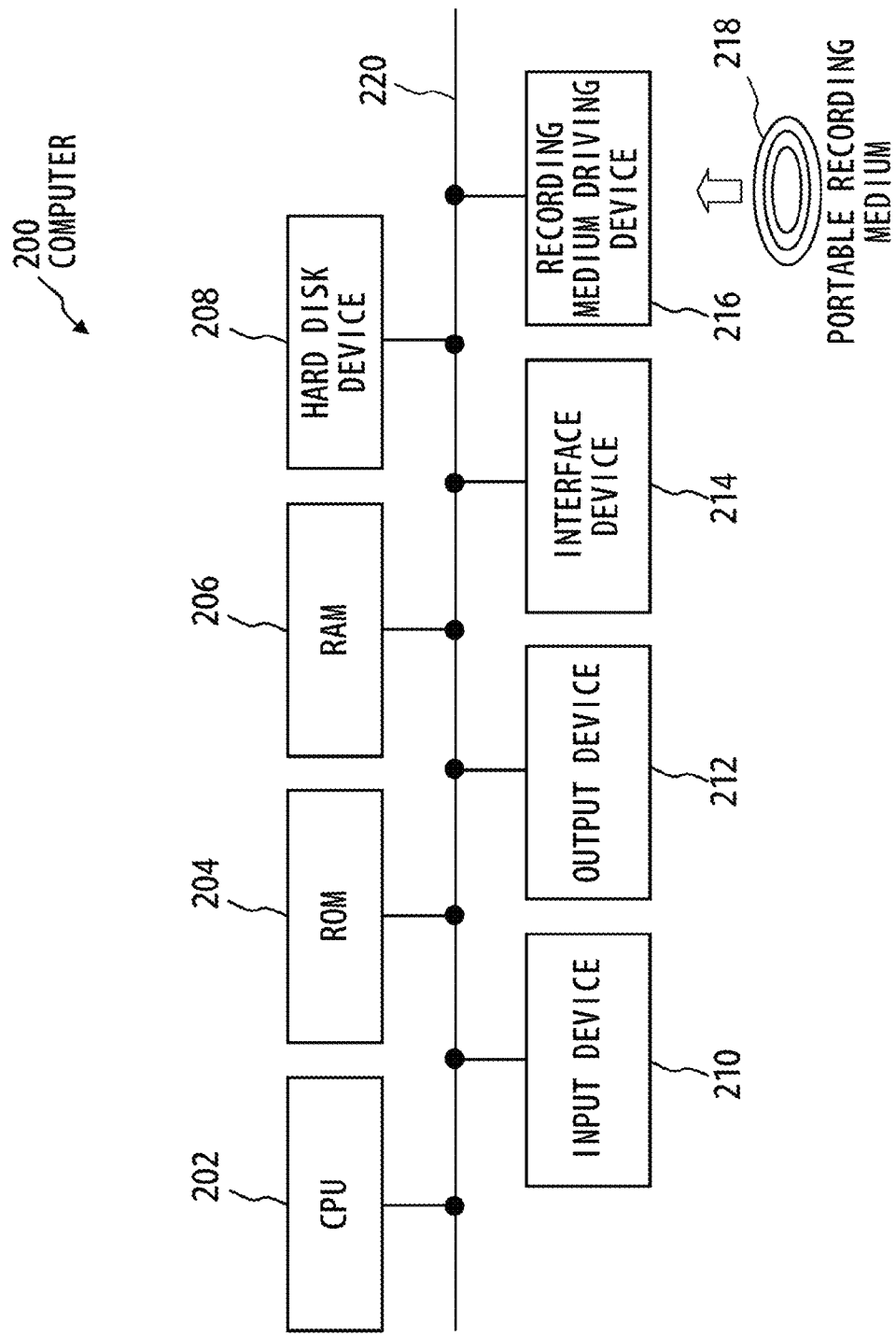
FIG. 19 illustrates an example of a configuration of a computer.

FIG. 19 illustrates an example of a configuration of the log analysis device 100 according to an embodiment. When the log analysis device 100 and the intrusion detection system 110 are incorporated, FIG. 19 also illustrates other examples including both of them.

This computer 200 includes a Central Processing Unit (CPU) 202, a Read Only Memory (ROM) 204, and a Random Access Memory (RAM) 206. The computer 200 further includes a hard disk device 208, an input device 210, a display device 212, an interface device 214, and a recording medium driving device 216. Also, these components are connected via a bus line 220 so that they can transmit and receive various types of data to each other under control of the CPU 202.

The CPU 202 is an arithmetic processing device that controls the entirety of the operations of the computer 200, and functions as the control processing unit of the computer 200.

The Read Only Memory (ROM) 204 is a read only semiconductor memory in which a prescribed basic control program is stored beforehand. The CPU 202 reads this basic control program upon the activation of the log analysis device 100 so as to control operations of the respective components of the computer 200.

The Random Access Memory (RAM) 206 is a semiconductor memory that can be read/write arbitrarily and is to be used as a work storage area on an as-needed basis when the CPU 202 executes various types of control programs.

The hard disk device 208 is a storage device that stores various control programs executed by the CPU 202 and various pieces of data. An CPU 202 reads a prescribed control program stored in the hard disk device 208 so as to execute the program, and thereby can perform various control processes, which will be described later.

The input device 210 is for example a mouse device or a keyboard device, and obtains inputs of various pieces of information associated with manipulation performed by a user of the information processing apparatus so as to transmit the obtained input information to the CPU 202.

The display device 212 is for example a liquid crystal display, and displays various texts and images in accordance with display data transmitted from the CPU 202.

The interface device 214 manages communication of various pieces of information with the various devices connected to this computer 200.

The recording medium driving device 216 is a device that reads various control programs and various pieces of data recorded in a portable recording medium 218. The CPU 202 reads a prescribed control program recorded in the portable recording medium 218 via the recording medium driving device 216 so as to execute the read program, and thereby can perform various control processes, which will be described later. Also, examples of the portable recording medium 218 include a flash memory having a Universal Serial Bus (USB) compatible connector, a Compact Disc Read Only Memory (CD-ROM), a Digital Versatile Disc Read Only Memory (DVD-ROM), etc.

In order to form the log analysis device or the intrusion detection system including the log analysis device by using the computer 200 as described above, a control program for example for causing the CPU 202 to execute the processes in the above respective process units is generated. A generated control program is stored beforehand in the hard disk device 208 or the portable recording medium 218. Then, a prescribed instruction is given to the CPU 202 so as to cause the CPU 202 to read and execute the control program. Thereby, the function included in the log analysis device or the instruction detection system including the log analysis device is provided by the CPU 202.

<Log Analysis Process>

Figure 20:
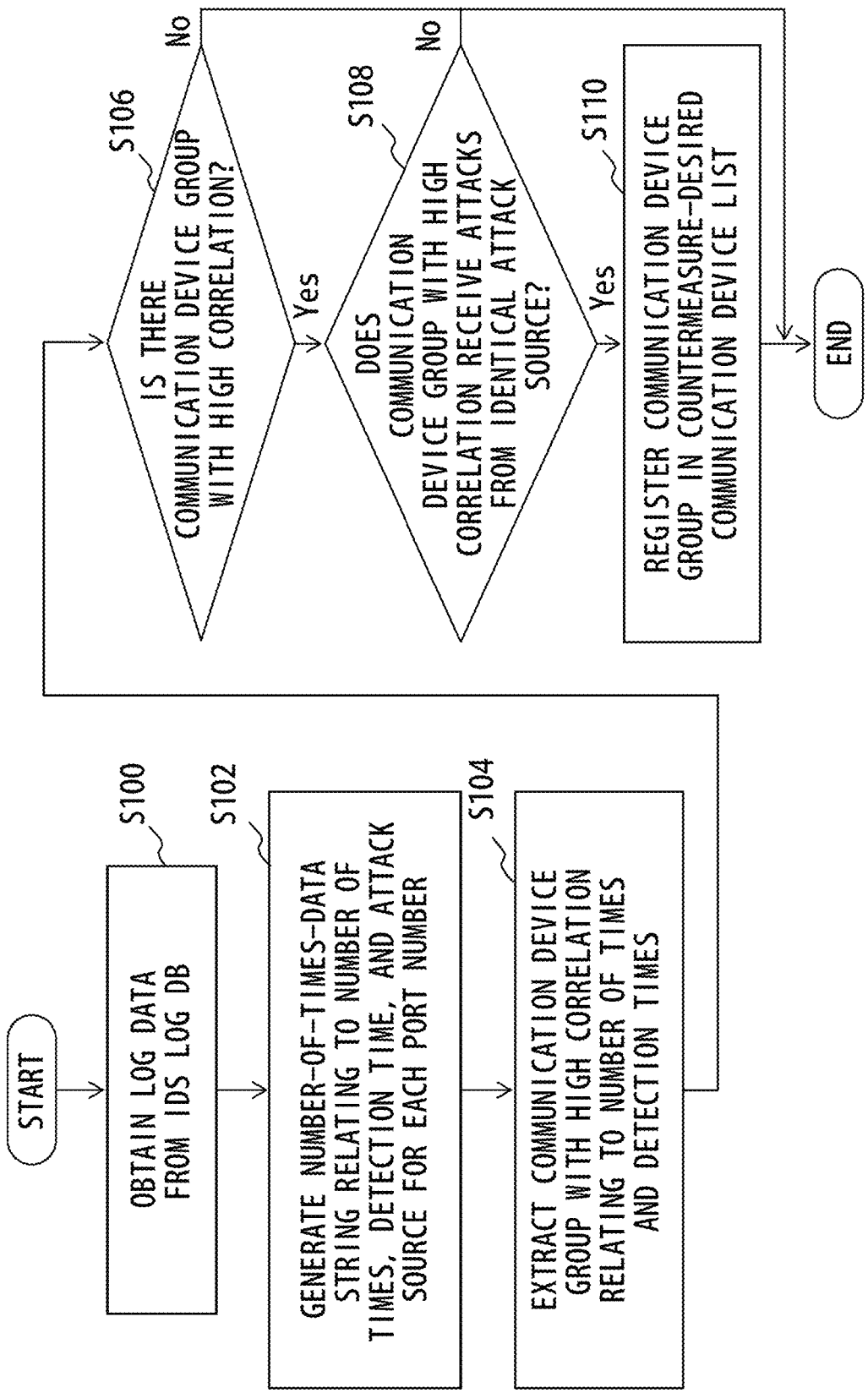
FIG. 20 illustrates a flow of a log analysis process.

FIG. 20 illustrates a flow of a log analysis process.

Also, when the log analysis device is the general-purpose computer 200 as illustrated in FIG. 19, the following explanations define a control program that performs such a process. In other words, the following explanations are also for a control program for causing a general-purpose computer to execute the processes explained below.

When the process has been activated, the brute force attack analysis unit 102 (the pair generation unit 1022) of the log analysis device 100 obtains data stored in the IDS log database (DB) 114 of the log analysis device 100 in S100.

Next, in S102, the brute force attack analysis unit 102 (pair generation unit 1022) of the log analysis device 100 generates a number-of-times-data string in relation to attack source (Hacker), attack target (Victim), detection time, the number of log-in attempts (the number of attacks), and ports of attack targets (Ports).

Next, in S104, the brute force attack analysis unit 102 (clique search unit 1024) of the log analysis device 100 calculates a correlation coefficient between vertexes from a graph expressing a pair of communication devices (Victims) formed in S102.

In subsequent S106, the brute force attack analysis unit 102 (output unit 1026) uses the correlation coefficient calculated in S104 so as to determine whether or not a clique is formed, and determines whether or not there is a high-coefficient communication device (Victim) group. In the determination of whether a clique is formed or not, it is also possible to perform the determination based on whether or not a correlation coefficient between vertexes is greater than a threshold of correlation coefficients stored in the analysis setting database 104. When the result of the determination is "Yes", i.e., when there is a high-correlation communication device (Victim) group, the process proceeds to S108. When the result of the determination is "No", i.e., when there are no high-correlation communication device (Victim) groups, the process terminates.

In S108, the brute force attack analysis unit 102 (the output unit 1026) determines whether or not an attack source from which candidates for attack target communication devices (Victims) with a high correlation selected in S106 received is identical. When the result of this determination is "Yes", i.e., when the candidates for attack target communication devices (Victims) with a high correlation did receive brute force attacks from an identical attack source, the process proceeds to S110. When the result of the determination is "No", i.e., when the candidates for attack target communication devices (Victims) with a high correlation received brute force attacks from attack sources that are not identical to each other, the process terminates.

In S110, the brute force attack analysis unit 102 (the output unit 1026) recognizes the candidates for attack target communication devices (Victims) with a high correlation that received brute force attacks from an identical attack source as high-correlation attack target communication devices (Victims), and registers them in the countermeasure-desired communication device list 150. Information included in the countermeasure-desired communication device list 150 is stored in the countermeasure-desired communication device (Victim) IP address database (DB) 118 of the intrusion detection system (IDS) 110. An attack target communication device (Victim) group with a high correlation is also referred to as a high-correlation communication device group in some cases.

Also, in S110, the interface unit 106 may display attack target communication devices (Victims) with a high correlation on a display etc. FIG. 8 illustrates an example thereof.

Also, in S110, the interface unit 106 transmits information about attack target communication devices (Victims) with a high correlation to the log analysis device 100. This information about attack target communication devices (Victims) with a high correlation corresponds to the countermeasure-desired communication device list 150 illustrated in FIG. 5.

By performing processes as described above, it is possible to identify communication devices that receive a brute force attack in which attacks are intermittently carried out on a plurality of attack targets by varying attack sources, and to identify a communication device that receives such an attack by analyzing a log of a security device over a short period of time in order to take countermeasures against such an attack.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A log analysis device that classifies, based on a log collected from a network device, a plurality of attack target communication devices encountering attacks from an attack source communication device, the log analysis device comprising:

a storage configured to store the log; and a processor configured to execute a process including calculating, based on the log stored in the storage, a correlation coefficient relating to the number of the encountered attacks in a time period during which the encountered attacks were carried out for a combination of the plurality of attack target communication devices, the time period including a detection time at which and a detection period of time during which the network device detected each of the encountered attacks, and extracting, as a high-correlation communication device group, a combination of the plurality of attack target communication devices, for which the correlation coefficient is equal to or greater than a prescribed threshold and of which the attack source communication device is identical in the time period, wherein the extracting the high-correlation communication device group includes extracting the high-correlation communication device group by extracting a clique from a graph that includes a vertex corresponding to information relating to the number of the encountered attacks in a time period, during which the encountered attacks were carried out and which includes the detection time and the detection period of time of each of the encountered attacks encountered by the plurality of attack target communication devices, and an edge given between vertexes corresponding to two of the plurality of attack target communication devices having a correlation coefficient equal to or greater than the prescribed threshold.

2. The log analysis device according to claim 1, wherein:

the encountered attacks are intermittently carried out over a plurality of terms, there are a plurality of the detection times, and each of the plurality of terms includes one of the plurality of detection times that are different from each other;

the calculating the correlation coefficient includes calculating, based on the log stored in the memory, a correlation coefficient relating to the number of the encountered attacks in each of the plurality of detection times at which and the plurality of terms during which the network device detected the encountered attacks, for a combination of the plurality of attack target communication devices; and the extracting the high-correlation communication device group includes extracting, as a high-correlation communication device group, a combination of the plurality of attack target communication devices, for which the correlation coefficients is equal to or greater than a prescribed threshold and of which the attack source communication device is identical in each of the terms.

3. The log analysis device according to claim 1, wherein each of the encountered attacks is a brute force attack and each of the encountered attacks is a log-in attempt.

4. A log analysis method for classifying, based on a log collected from a network device, a plurality of attack target communication devices encountering attacks from an attack source communication device, the log analysis method comprising:
    calculating, based on the log, a correlation coefficient relating to the number of the encountered attacks in a time period during which the encountered attacks were carried out for a combination of the plurality of attack target communication devices, the time period including a detection time at which and a detection period of time during which the network device detected each of the encountered attacks; and
    extracting, as a high-correlation communication device group, a combination of the plurality of attack target communication devices, for which the correlation coefficient is equal to or greater than a prescribed threshold and of which the attack source communication device is identical in the time period, wherein
    the extracting the high-correlation communication device group includes extracting the high-correlation communication device group by extracting a clique from a graph that includes a vertex corresponding to information relating to the number of the encountered attacks in a time period, during which the encountered attacks were carried out and which includes the detection time and the detection period of time of each of the encountered attacks encountered the plurality of attack target communication devices, and an edge given between vertexes corresponding to two of the plurality of attack target communication devices having a correlation coefficient equal to or greater than the prescribed threshold.

5. The log analysis method according to claim 4, wherein:
    the encountered attacks are intermittently performed over a plurality of terms, there are a plurality of the detection times, and each of the plurality of terms includes one of the plurality of detection times that are different from each other;
    the calculating the correlation coefficient includes calculating, based on the log, a correlation coefficient relating to the number of the attacks in each of the plurality of detection times at which and the plurality of terms during which the network device detected the encountered attacks, for a combination of the plurality of attack target communication devices; and
    the extracting the high-correlation communication device group includes extracting, as a high-correlation communication device group, a combination of the plurality of attack target communication devices, for which the correlation coefficient is equal to or greater than a prescribed threshold and of which the attack source communication device is identical in each of the terms.

6. The log analysis method according to claim 4, wherein each of the encountered attacks is a brute force attack and each of the encountered attacks is a log-in attempt.

7. A non-transitory computer-readable recording medium having stored therein a program for causing a computer to execute a process for classifying, based on a loci collected from a network device, a plurality of attack target communication devices encountering attacks from an attack source communication device, the process comprising:
    calculating, based on the log, a correlation coefficient relating to the number of the encountered attacks in a time period during which the encountered attacks were carried out for a combination of the plurality of attack target communication devices, the time period including a detection time at which and a detection period of time during which the network device detected each of the encountered attacks; and
    extracting, as a high-correlation communication device group, a combination of the plurality of attack target communication devices, for which the correlation coefficient is equal to or greater than a prescribed threshold and of which the attack source communication device is identical in the time period, wherein
    the extracting the high-correlation communication device group includes extracting the high-correlation communication device group by extracting a clique from a graph that includes a vertex corresponding to information relating to the number of the encountered attacks in a time period, during which the encountered attacks were carried out and which includes the detection time and the detection period of time of each of the encountered attacks encountered the plurality of attack target communication devices, and an edge given between vertexes corresponding to two of the plurality of attack target communication devices having a correlation coefficient equal to or greater than the prescribed threshold.

8. The non-transitory computer-readable recording medium according to claim 7, wherein:
    the encountered attacks are intermittently performed over a plurality of terms, there are a plurality of the detection times, and each of the plurality of terms includes one of the plurality of detection times that are different from each other;
    the calculating the correlation coefficient includes calculating, based on the log, a correlation coefficient relating to the number of the attacks in each of the plurality of detection times at which and the plurality of terms during which the network device detected the encountered attacks, for a combination of the plurality of attack target communication devices; and
    the extracting the high-correlation communication device group includes extracting, as a high-correlation communication device group, a combination of the plurality of attack target communication devices, for which the correlation coefficient is equal to or greater than a prescribed threshold and of which the attack source communication device is identical in each of the terms.

9. The non-transitory computer-readable recording medium according to claim 7, wherein
    each of the encountered attacks is a brute force attack and each of the attack encountered attacks is a log-in attempt.

* * * * *